US010953432B2

(12) United States Patent
Rao

(10) Patent No.: US 10,953,432 B2
(45) Date of Patent: Mar. 23, 2021

(54) SUPERHYDROPHOBIC COATINGS

(71) Applicant: Worcester Polytechnic Institute, Worcester, MA (US)

(72) Inventor: Pratap Rao, Worcester, MA (US)

(73) Assignee: Worcester Polytechnic Institute, Worcester, MA (US)

( * ) Notice: Subject to any disclaimer, the term of this patent is extended or adjusted under 35 U.S.C. 154(b) by 128 days.

(21) Appl. No.: 16/000,154

(22) Filed: Jun. 5, 2018

(65) Prior Publication Data
US 2019/0134664 A1    May 9, 2019

Related U.S. Application Data

(60) Provisional application No. 62/515,136, filed on Jun. 5, 2017.

(51) Int. Cl.
| | | |
|---|---|---|
| *B05D 5/00* | (2006.01) | |
| *B05D 3/10* | (2006.01) | |
| *B05D 5/08* | (2006.01) | |
| *B32B 3/26* | (2006.01) | |
| *B05D 1/32* | (2006.01) | |
| *B82Y 30/00* | (2011.01) | |
| *B82Y 40/00* | (2011.01) | |

(52) U.S. Cl.
CPC ............... *B05D 5/00* (2013.01); *B05D 3/107* (2013.01); *B05D 5/08* (2013.01); *B32B 3/26* (2013.01); *B05D 1/32* (2013.01); *B05D 2350/63* (2013.01); *B82Y 30/00* (2013.01); *B82Y 40/00* (2013.01)

(58) Field of Classification Search
CPC ........................................................ B05D 5/00
USPC ........................................................ 428/195.1
See application file for complete search history.

(56) References Cited

U.S. PATENT DOCUMENTS

| | | | |
|---|---|---|---|
| 7,258,731 | B2 | 8/2007 | D'Urso et al. |
| 2007/0003705 | A1 | 1/2007 | Strauss |
| 2011/0229667 | A1 | 9/2011 | Jin et al. |
| 2011/0240595 | A1 | 10/2011 | Dubrow |
| 2014/0011013 | A1 | 1/2014 | Jin et al. |

OTHER PUBLICATIONS

International Search Report, PCT/US2018/035997, pp. 2, dated Nov. 15, 2018.

Kwak, et al., "Superhydorphobic ZnO Nanowire Surface: Chemical Modification and Effects of UV Irradiation", Jan. 5, 2009; Revised Manuscript Received: May 14, 2009, pp. 12085-12089; Surface Chemistry Laboratory of Electronic Materials, Department of Chemical Engineering, Pohang University of Science and Technology.

Guo, et al., "Highly Hydrophilic and superhydrophobic ZnO nanorod array films", Dec. 8, 2005, revised Jan. 25, 2007, accepted Mar. 5, 2007, available online Mar. 27, 2007; pp. 7162-7166; Sciencedirect, www.sciencedirect.com.

(Continued)

*Primary Examiner* — Ian A Rummel
(74) *Attorney, Agent, or Firm* — Armis IP Law, LLC

(57) ABSTRACT

A superhydrophobic surface is formed by growing a plurality of etchable, sacrificial structures, and depositing a discontinuous hydrophobic material onto the sacrificial structures. The discontinuity facilitates etching of the sacrificial structures to remove the grown structures while leaving the deposited material intact to result in surface features for achieving superior hydrophobic properties.

13 Claims, 2 Drawing Sheets

(56) References Cited

OTHER PUBLICATIONS

Hosono, et al. "Superhydrophobic Perpendicular Nanoppin Film by the Bottom-Up Process", Jun. 8, 2005; pp. 13458-13459; J. Am. Chem Soc., National Institute of Advanced Industrial Science and Technology, Umezono, Keio University, Published on Web Aug. 31, 2005.

Jin, et al., "Super-Hydrophobic PDMS Surface with Ultra-Low Adhesive Force"; Jul. 1, 2205, Revised Aug. 11, 2005; accepted Sep. 20, 2005; pp. 18-05-1809; Macromolecular Rapid Communications.

Qian, et al., "Fabrication of Superhydrophobic Surfaces by Dislocation-Selective Chemical Etching on Aluminum, Copper, and Zinc Substrates", Received May 17, 2005, Final form Aug. 17, 2005, Published on web Aug. 31, 2005; pp. 9007-9009.

Lee, et al., "Extremely Superhydrophoboc Surfaces with Micro-and Nanostructures Fabricated by Copper Catalytic Etching", Sep. 25, 2010, Published Dec. 16, 2010; pp. 809-814, Langmuir Article.

Yu, et al., "Extreme wettability of nanostructured glass fabricated by non-lithographic, anisotropic etching", Received Nov. 27, 2014, accepted Mar. 2, 2015, published Mar. 20, 2015, pp. 1-6, Scientific Reports.

Wong, et al., "Bioinspired self-repairing slippery surfaces with pressure-stable omniphobicity", Sep. 22, 2011, pp. 1-5, Macmillan Publishers; vol. 477.

Yuan, et al. "ZnO nanowire array-templated LbL self-assembled polyelectrolyte nanotube arrays and application for charged drug delivery" Received Aug. 5, 2012, final form Oct. 29, 2012 and published Jan. 8, 2013; pp. 1-8; IOP publishing.

Xu, et al., "Fabrication of a superhydrophobic ZnO nanorod array film on cotton fabrics via a wet chemical route and hiydrophobic modification"; received Jan. 10, 2008; revised Mar. 21, 2008, accepted Mar. 21, 2008 and available online Apr. 8, 2008; pp. 5899-5904; Science Direct; www.elsevier.com/locate/apsusc.

SUPERHYDROPHOBIC COATINGS

RELATED APPLICATIONS

This patent application claims the benefit under 35 U.S.C. § 119(e) of U.S. Provisional Patent App. No. 62/515,136, filed Jun. 5, 2017, entitled "HYDROPHOBIC COATING," incorporated herein by reference in entirety.

BACKGROUND

Hydrophobic surfaces tend to repel water, in contrast to hydrophilic surfaces that tend to attract water and achieve a "wet" appearance. When a drop of water is placed on a surface, and the drop makes a contact angle of less than 90° with the surface, the surface is termed "hydrophilic". If the water contact angle is greater than 90°, the surface is termed "hydrophobic", and if the water contact angle exceeds 150°, the surface is termed "superhydrophobic" or "ultrahydrophobic." The water contact angle for the most hydrophobic materials in the form of a planar film (for instance polytetrafluoroethylene, i.e. PTFE, Teflon or paraffin wax) is about generally accepted as being around 110°, while that of $CF_3$ terminated surfaces is as high as 120°.

SUMMARY

The superhydrophobic coatings disclosed herein embrace a feature known as the "Lotus Effect," a response that occurs on the surfaces of many plants, including the leaf of the Lotus plant. This effect occurs on surfaces composed of a hydrophobic material, containing surfaces features that are typically on the micro- and/or nano-scale, when air is trapped in between the valleys of the surface features so that the water only makes contact with the material at the tips of the surface features. This is called the Cassie-Baxter wetting state. When this type of wetting occurs, the contact area between water and the surface is very small, resulting in greater hydrophobicity of the surface than that achieved by a planar film of the same material. Thus, the nano- and/or micro-structures amplify the natural hydrophobic property of the surface material. Moreover, hierarchical roughness such as nanoscale roughness on top of microscale roughness, results in more robust superhydrophobic behavior.

Water roll-off angle (also known as slide angle) is another important measure of hydrophobicity. This refers to the angle at which the surface must be inclined relative to horizontal, in order to cause a water droplet placed on the surface to roll off the surface. Surfaces are considered superhydrophobic if they exhibit water roll-off angles of 20° or smaller, and reported structured surfaces exploiting the Lotus effect can achieve water roll-off angles of ~10°.

Conventional approaches to superhydrophobic surface fabrication attempt to create a micro- or nano-structured surface composed of a hydrophobic material by either 1) sequentially depositing a micro- or nano-structured material followed by a hydrophobic material; 2) sequentially etching a surface to create a micro- and/or nano-structured surface followed by deposition of a hydrophobic material 2) concurrently depositing a mixture of micro- or nano-structured materials and a hydrophobic material; 3) depositing a micro- or nano-structured material that is itself hydrophobic; or 4) depositing a smooth hydrophobic material followed by etching of the hydrophobic material itself to create a micro- and/or nano-structured surface. Such conventional approaches are distinct from the disclosed approach, which involves etching of a deposited sacrificial material as a salient feature in the generation of a superhydrophobic coating.

The claimed approach involves a method of fabricating a superhydrophobic surface by growing a plurality of sacrificial structures, and depositing a discontinuous hydrophobic material onto the sacrificial structures. The discontinuity facilitates etching of the sacrificial structures to remove the grown structures while leaving the deposited material intact to result in surface features for achieving superior hydrophobic properties.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
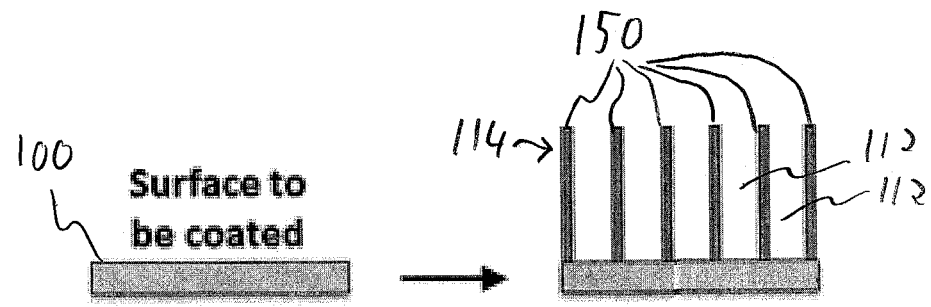
FIG. 1 is a side elevation of sacrificial structures on a surface substrate.

The description below presents a superhydrophobic (also known as ultrahydrophobic) coating. The coating is based on a hydrophobic material containing pores. These pores are created by etching of sacrificial nano- and/or micro-scale structures that are grown on a surface. Methods for creating this coating are also disclosed. In contrast to conventional superhydrophobic coatings, the coatings and methods disclosed here have advantages in terms of improved manufacturability, improved control over the nano- and micro-scale structure, improved safety (decreased toxicity), and others.

The disclosed superhydrophobic coating repels water, and can therefore have self-cleaning, anticorrosion and antimicrobial functions. Coatings like this are needed for surfaces that must be kept clean, but are difficult or expensive to clean, such as solar panels, or in food processing/packaging or medical settings in which microbial growth on surfaces must be prevented. These types of coatings can also be important for heat transfer applications such as in air conditioners or refrigerators, to prevent the formation of water, ice or frost films on heat exchanger surfaces, which could otherwise limit the heat transfer rate. Such coatings can also be used on textiles or textile fibers to render them superhydrophobic. Yet another possible application is in semipermeable membranes.

Various conventional approaches demonstrate some form of superhydrophobicity by the Lotus Effect (that is, via surface roughness). Broadly speaking, there are three general methods by which to make a superhydrophobic coating. The first method is to deposit a hydrophobic material that has a high degree of roughness. This can be done in a single step by directly depositing a rough hydrophobic material, or in two steps by first depositing a smooth hydrophobic material and then roughening it by an etching process. The second method is to first create a rough surface consisting of a non-hydrophobic material, and then coat it with a hydrophobic material. The rough surface can be created either by etching an existing surface or by deposition of particles or other structures onto a surface. There is a third class of methods that involve some sort of sacrificial material or template that directs the structure of the deposited hydrophobic material, but is etched away or otherwise removed later on. Details of a representative sampling of all these types of superhydrophobic coatings and methods for realizing them are summarized below. However, none of these conventional approaches disclose a coating or a method of coating that duplicates or is substantially similar to the proposed approach.

Advantages of the approach disclosed herein include the following features.

Previous superhydrophobic coatings based on the Lotus Effect require relatively complicated/expensive/time-consuming steps to realize the necessary nano- and/or microstructured surface roughness. On the other hand, the present coating and method of synthesis are very simple, and requires minimal processing in terms of drying, and no high-temperature or vacuum processes are required. Furthermore, no microfabrication, patterning or lithography is required for the coating to achieve the superhydrophobic effect. The entire coating can be synthesized purely by scalable techniques such as chemical bath deposition, spray-coating, dip-coating and painting.

Another advantage of the disclosed approach is that the roughness provided by etching away the nano- or microstructures results in stronger hydrophobic behavior than the roughness provided by the nano- or micro-structures themselves. This is a result of the increased surface area, formation of channels, and the re-entrant shape of the resulting pores. Therefore, this approach is superior to previous approaches that simply form composites of nano- and/or micro-structures and polymers.

Another advantage of this approach is that it is compatible with any polymer and solvent, so long as the polymer is soluble in the solvent, and the solvent does not etch or dissolve the nanomaterial that will act as the template. Consequently, a wide range of polymers and solvents are permissible. Therefore, the polymer can be chosen primarily based on its other desirable, functional properties, such as hydrophobicity, mechanical properties, adhesion, glass transition temperature, etc.

Another advantage of this approach is that the final coating is devoid of inorganic particles, as they are dissolved away in the last step, which decreases risks of toxicity and thereby improves food safety, medical safety, environmental safety.

The disclosed approach can achieve tailored nanostructures and porosity, achieved by selection of the shape of the template nanomaterial. The thickness of the coating and the number density of the pores can be independently controlled by varying the concentrations of the polymer and the number density of the micro- or nanostructures. Further, the coating can be made very thin (less than 500 nm) to minimize resistance to heat transfer, or the coating can be made very thick (several microns to tens of microns) to maximize its durability in high contact/abrasive applications.

FIG. 1 is a side elevation of sacrificial structures on a surface substrate. Referring to FIG. 1, a substrate 100 is receptive to formation of sacrificial structures 150. The sacrificial structures are grown onto the surface to be coated. These structures can be microstructures, nanostructures, or a combination of micro- and nano-structures. The sacrificial structures include a network of features spaced based on an intended scale of the fabricated, post-etching structures consistent with the superhydrophobic property. These structures can be deposited by any available means, can take any physical shape, and can have any composition so long as they can be etched by a chemical that does not damage the hydrophobic material that will be deposited in the next step. Examples of sacrificial structures that can be grown on the surface include nano- and/or micro-wires, tubes and belts, or branched or hierarchical structures such as microwire trunks with nanowire branches. The structures can be straight, tapered or stepped, and can have any cross-section shape. In an example approach, discussed further below, the sacrificial structures are zinc oxide (ZnO) nanowire-arrays.

Methods for the deposition of such structures may be formed from hydrothermal growth, solution deposition, electrodeposition, and physical or chemical vapor deposition, or other suitable method. The use of tapered or stepped shaped can result in re-entrant shape of the hydrophobic material coated in the next step, which can result in super-omniphobicity, instead of only superhydrophobicity. Depending on the shape of the sacrificial structures, voids 112 or valleys will emerge, along with peaks or tips 114 that define a topology, and which play a role in a hydrophobic material dispersal over the substrate 100.

Figure 2:
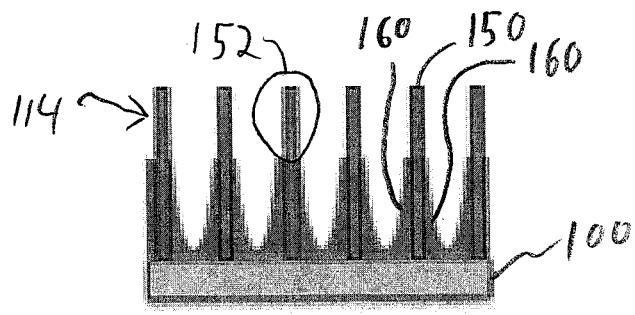
FIG. 2 shows deposition of hydrophobic material onto the structures of FIG. 1.

FIG. 2 shows deposition of hydrophobic material onto the structures of FIG. 1. Referring to FIGS. 1 and 2, once the sacrificial structures 150 are stable, a coating of a hydrophobic material 160 is deposited onto the sacrificial structures 150 such that the structures are not completely coated/covered. This include depositing a liquid hydrophobic material such that a portion 152 of the sacrificial structures remain uncoated by the hydrophobic material 160. In other words, some portion of the structures (typically the tips 114) remains uncoated by the hydrophobic material 160. This deposition results in uncoated portions defined by the tips 114 of sacrificial structures rising above a general topography of the deposited sacrificial structures. In particular configurations, the hydrophobic material 160 can be a polymer or other hydrophobic material that is resistant to the etchant used to remove the sacrificial structures, so that the hydrophobic material 160 will not be damaged by the etchant.

The hydrophobic material 160 can be a one-part polymer or a two-part polymer (base and curing agent), or other suitable polymer formulation, including a melt or solution. Moreover, the hydrophobic material and its solvent (if needed) should not etch the sacrificial structures. The hydrophobic material can be deposited as a liquid by any available method, such as spin-coating, dip-coating, drop-casting or spraying, or can also be deposited from the vapor by physical or chemical vapor deposition. In the case of deposition from a solution, the solvent should be evaporated after deposition. The coating can also be a hydrophobic self-assembled monolayer (SAM). Typical hydrophobic materials envisioned include hydrophobic polymers such as polystyrene, siloxanes and fluorinated polymers such as PTFE, FEP or amorphous fluoropolymers, although any suitable hydrophobic material can be used. In an example arrangement, the hydrophobic material includes polystyrene with toluene and deposition includes spin-coating onto ZnO nanowire-arrays, such that toluene evaporation results in uncoated tips 114 of the sacrificial structures 150.

Figure 3:
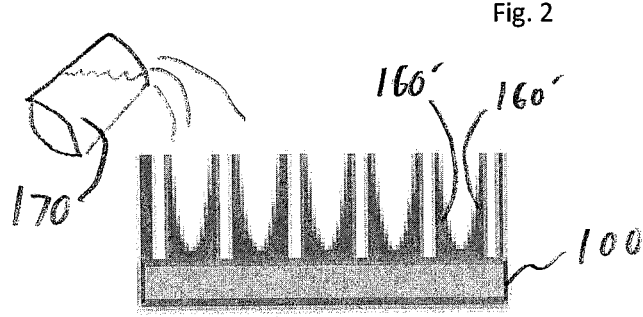
FIG. 3 shows etched structures resulting from the etching of the surfaces of FIG. 2.

FIG. 3 shows etched structures resulting from the etching of the surfaces of FIG. 2. Referring to FIG. 3, an etching process etches away the sacrificial structures using an etching chemical (etchant 170) that does not remove the hydrophobic material 160, leaving behind the hydrophobic material only, containing pores. The etchant 170 can be in the liquid or gas phase, and the etching method can be any isotropic or anisotropic etching method. etching includes immersion in an HCL or $CH_3COOH$ solution. Thus, the sacrificial structures 150 are responsive to an etching substance that leaves the deposited hydrophobic material unmodified, resulting in the surface features 160' define by the remaining, post-etching hydrophobic material.

Figure 4:
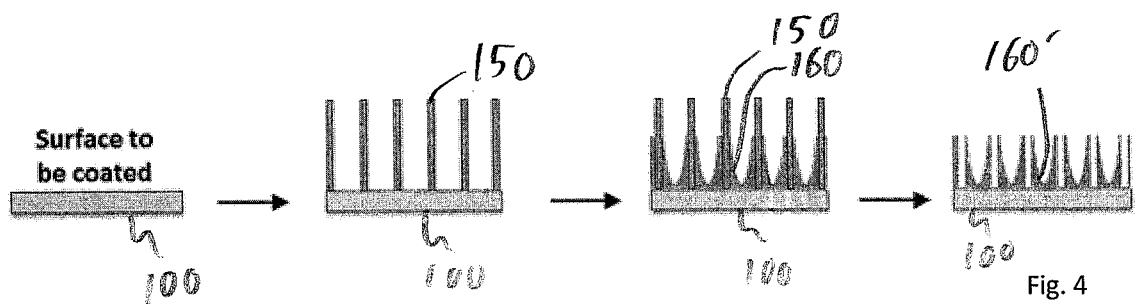
FIG. 4 shows a progression of the etching process of FIGS. 1-3.

FIG. 4 shows a progression of the etching process of FIGS. 1-3. Referring to FIGS. 1-4, an example test configuration is shown, including zinc oxide (ZnO) nanowire-arrays as the sacrificial structure 150, polystyrene as the polymer with toluene as the solvent defining the hydrophobic material 160, and either dilute hydrochloric acid (HCl) or dilute acetic acid ($CH_3COOH$) as the etchant 170 for the ZnO sacrificial structures 150. In an example configuration, first, the ZnO nanowire-arrays were synthesized on the glass substrate 100 by a hydrothermal method. Then, a solution of polystyrene in toluene (1:10 polystyrene:toluene mass ratio) was spin-coated onto the ZnO nanowire-arrays. The toluene was then allowed to evaporate. The resulting polystyrene film coated the sides of the ZnO nanowires, but not the tips. Finally, the ZnO nanowire-arrays coated with polystyrene were immersed in a dilute solution of HCl or $CH_3COOH$ for 2 minutes, which dissolved the ZnO nanowires. The resulting nanostructured polystyrene coating was finally rinsed with water and dried. For comparison, polystyrene was also spin-coated onto a flat surface, resulting in a smooth, planar polystyrene film. The resulting surface features are of a size in the micro and/or nano scale, and are such that the resulting surface features exhibit a roll-off angle of less than 20 degrees.

Figure 5:
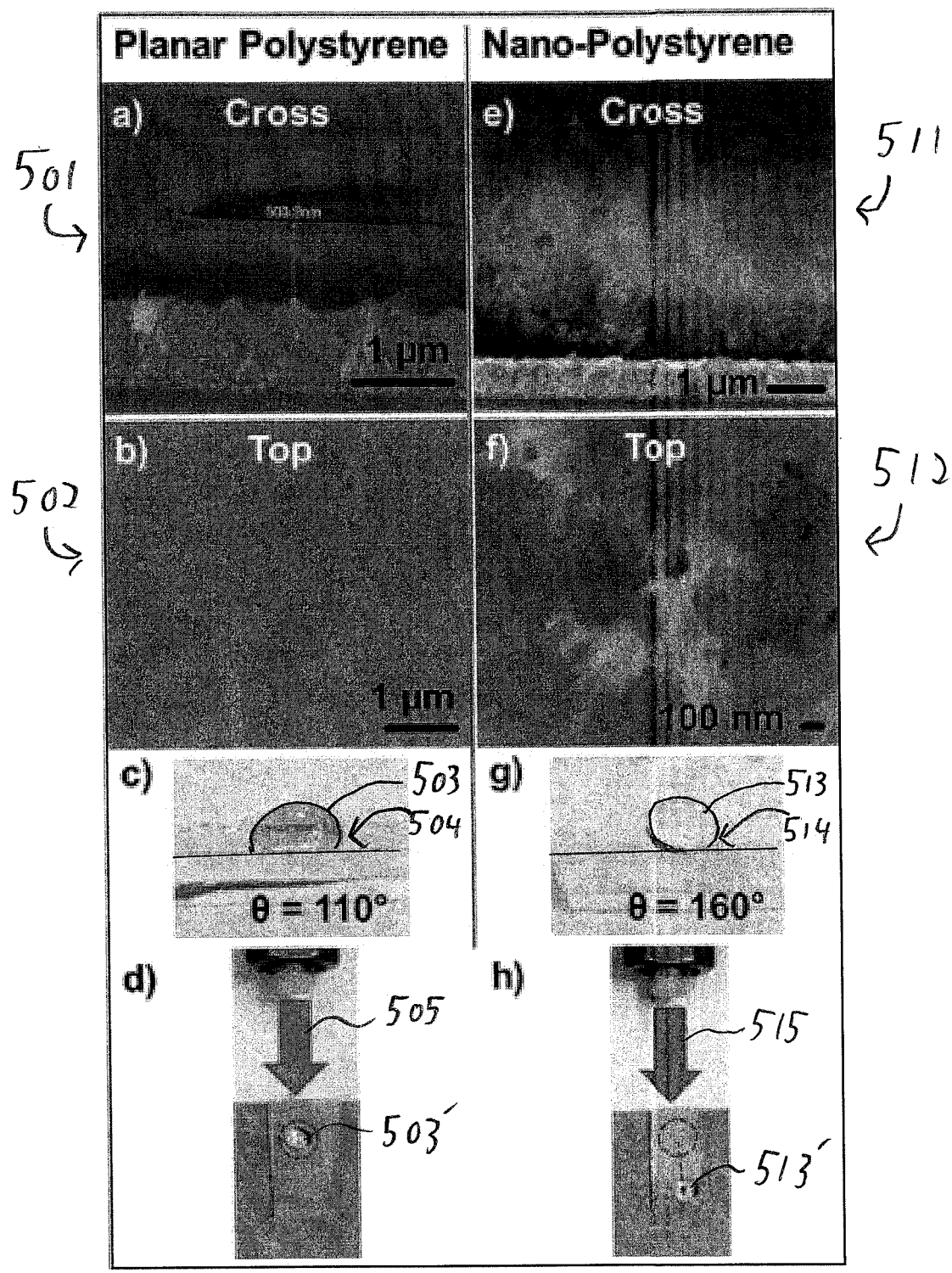
FIG. 5 shows microscopic rendering of an etching prototype of FIGS. 1-4.

FIG. 5 shows microscope rendering of an etching prototype as shown in FIGS. 1-4. Referring to FIG. 5, scanning electron micrographs of the cross-section 501 and top 502 view of the planar polystyrene coating are shown, respectively. A photograph of a water droplet 503 on this planar polystyrene coating demonstrates a contact angle 504 of approximately 110° C., which indicates hydrophobic behavior, but not necessarily superhydrophobic behavior. A stream of moving air directed at the water droplet 503' on the planar polystyrene coating did not result in motion of the droplet.

Scanning electron micrographs of the cross-section 510 and top-views 511 of the nanostructured polystyrene coatings are also shown, respectively. A photograph of a water droplet 513 on this nanostructured polystyrene coating demonstrates a contact angle 514 of approximately 160° C., which indicates superhydrophobic behavior. A stream 515 of moving air directed at the water droplet on the planar polystyrene coating resulted in immediate motion of the droplet 513' off the coated section of the substrate. Very low droplet roll-off (aka sliding) angles of only a few degrees were also measured.

Conventional approaches include is US 2007/0003705), entitled "Renewable Superhydrophobic Coating." This patent describes a method of forming a superhydrophobic coating by mixing a hydrophobic material with soluble particles to form a mixture. The mixture is deposited onto a surface and then cured. Then, a portion of the soluble particles is etched away from the mixture to form the superhydrophobic coating. Here, when the soluble particles are dissolved, they render the remainder superhydrophobic by virtue of its rough surface shape.

U.S. Pat. No. 7,258,731, entitled "Composite, nanostructured, super-hydrophobic material, demonstrates an applied coating, which consists of two interpenetrating, differentially-etchable materials. The interpenetrating materials can be produced by any method, including by heating and cooling a mixture via spinodal decomposition or nucleated decomposition, or by sintering particles, etc. One of the materials is then etched away using a selective etchant, resulting in the other material surviving as a protruding, rough phase with nanoscale porosity and roughness. The protruding material may be further etched by some other etchant to create other (larger) features such as spikes. The superhydrophobic property of the coating arises if the protruding material is itself hydrophobic, or because of the addition of a layer of hydrophobic material to the surface of the protruding phase.

One conventional approach includes ZnO nanorod-arrays grown onto a surface by a hydrothermal method at 90° C. for 1 hour, followed by coating with alkanoic acids. Stable superhydrophobicity with contact angles greater than 150° was achieved for alkanoic acids having length greater than 16 carbon atoms. 30 Several other very similar coatings consisting of similarly-grown ZnO nanorod-arrays coated with other hydrophobic molecules have subsequently been reported. 31-33 Similarly, cobalt hydroxide nanorod-arrays were synthesized by a hydrothermal process at 60° C. for 24 hours and then coated with lauric acid to achieve a superhydrophobic coating with water contact angle of 178°. Similar efforts showed that a superhydrophobic surface could be created from a slightly hydrophilic material (flat films of lauric acid have a contact angle of 75°), as long as a Cassie-type composite interface is maintained. However, these instances are all different from the disclosed approach because the nanostructures are not etched.

Other conventional approaches include etching of smooth hydrophobic materials to create rough surfaces that are superhydrophobic. For example, polydimethylsiloxane was laser-etched to produce a rough surface with contact angle higher than 160° and sliding angle lower than 5°. However, this is different from the present invention because the hydrophobic material is not itself etched in the present invention—rather, a sacrificial material is etched.

Etching of smooth surfaces has been used to create rough surfaces, after which a hydrophobic material is deposited to create a superhydrophobic surface. For example, polycrystalline metals were etched using a chemical that preferentially dissolves the dislocation sites in the grains. The etched metallic surfaces, when hydrophobized with fluoroalkylsilane, exhibited superhydrophobic properties with water contact angles of larger than 150°, as well as roll-off angles of less than 10°. Similarly, silicon surfaces were roughened by Cu-assisted chemical etching, followed by spin-coating of a fluoropolymer, which resulted in a contact angle of nearly 180°. In another example, glass was etched by CF4 plasma to achieve a rough surface, followed by coating with a hydrophobic material to achieve a superhydrophobic surface. However, unlike the present invention, in all of these cases the etching is done before adding the hydrophobic material.

SLIPS™ (Slippery Liquid-Infused Porous Surfaces) is another type of superhydrophobic coating, which relies on immiscibility of a liquid infused into a porous coating and a liquid that is to be repelled from the coating. It is not based on the Lotus effect.

Also pertinent to the present disclosure are previous studies in which polymers and other materials have been deposited onto zinc oxide (ZnO) nanorod-arrays, followed by etching away of the ZnO nanorod-arrays. For instance, ZnO nanorod-arrays synthesized on a surface by a hydrothermal method were coated uniformly by polyelectrolyte multilayers in a layer-by-layer fashion, followed by etching away ZnO to result in polyelectrolyte nanotube arrays. However, unlike in the present invention, a hydrophobic polymer was not coated, and a hydrophobic or superhydrophobic surface was not achieved. Moreover, unlike in the present approach, the nanorods were completely coated, resulting in the formation of closed nanotubes after the ZnO was etched away. In another instance, ZnO nanorod-arrays were grown onto a surface by a vapor deposition method, followed by deposition of tin oxide (SnO2), also by a vapor deposition method, resulting in the formation of SnO2 nanotubes. 41 However, again, a hydrophobic polymer was not coated, and a hydrophobic or superhydrophobic surface was not achieved.

A final distinction is illustrated by conventional re-entrant surface topologies, which enable stable super-phobic behavior for structured surfaces even for liquids having contact angles significantly less than 90° on the flat material. This enables both superhydrophobicity and superoleophobicity, together referred to as superomniphobicity. For material surfaces and high-surface-tension liquids with flat-substrate contact angles well above 90°, the Cassie-Baxter state typically provides the minimum-energy state and gives rise to superhydrophobicity. However, for very low surface tension liquids, the flat-substrate contact angle for all known materials is well below 90° ("philic" behavior). In this case, the Cassie-Baxter state typically becomes unstable, and the liquid tends to assume the minimum-energy Wenzel state in which the substrate is fully wetted. However, surface structures having significant overhang can prevent the transition to the fully-wetted Wenzel state. Examples include nail- or mushroom-shaped structures, or inverted cone or pyramid structures, which are termed "re-entrant" features. To achieve even modest values of advancing contact angle, well below 90°, on the overhanging surfaces of these structures, the liquid surface would have to deform considerably or "sag" in between neighboring nano-features, leading to a liquid-air interface with curvature on the order of several inverse micrometers, which could only occur under high applied hydrostatic pressure. Thus, unless high pressure is applied, the liquid has to stay on top of the nanonails and is unable to penetrate inside and wet the nanostructured layer. Nanonails, micro-hoodoos and electrospun fibers all have re-entrant shapes and display superomniphobicity.

However, none of the conventional approaches show, teach or disclose the growth of nano- or micro-structures onto a surface, followed by deposition of a hydrophobic material, followed by etching away of the nano- or micro-structures, as in the present disclosure.

While the system and methods defined herein have been particularly shown and described with references to embodiments thereof, it will be understood by those skilled in the art that various changes in form and details may be made therein without departing from the scope of the invention encompassed by the appended claims.

What is claimed is:

1. A method of fabricating a superhydrophobic surface, comprising:

growing a plurality of sacrificial structures defined by a microstructure growth or deposition;

depositing a discontinuous hydrophobic material onto the sacrificial structures_; and etching the sacrificial structures to remove the grown structures while leaving the deposited material intact to result in surface features using an etchant based on compatibility with the hydrophobic material.

2. The method of claim 1 wherein the resulting surface features are of a size in the micro and/or nano scale.

3. The method of claim 2 wherein the sacrificial structures include at least one of nano- and/or micro-wires, tubes and belts, or branched or hierarchical structures such as microwire trunks with nanowire branches.

4. The method of claim 1 wherein the sacrificial structures include a network of features spaced based on an intended scale of the fabricated, post-etching structures consistent with the superhydrophobic property.

5. The method of claim 4 further comprising forming the sacrificial structures through deposition including at least one of hydrothermal growth, solution deposition, electrodeposition, and physical or chemical vapor deposition.

6. The method of claim 1 wherein the hydrophobic material is a coating of a hydrophobic self-assembled monolayer (SAM).

7. The method of claim 6 further comprising depositing a liquid hydrophobic material such that a portion of the sacrificial structures remain uncoated by the hydrophobic material.

8. The method of claim 7 wherein the uncoated portions are defined by tips of sacrificial structures rising above a general topography of the deposited sacrificial structures.

9. The method of claim 8 wherein the sacrificial structures are responsive to an etching substance that leaves the deposited hydrophobic material unmodified.

10. The method of claim 1 wherein the resulting surface features exhibit a roll-off angle of less than 20 degrees.

11. The method of claim 1 wherein the sacrificial structures are non-reentrant.

12. A method of fabricating a superhydrophobic surface, comprising:

growing a plurality of sacrificial structures;

depositing a discontinuous hydrophobic material onto the sacrificial structures; and etching the sacrificial structures to remove the grown structures while leaving the deposited material intact to result in surface features, wherein the sacrificial structures are zinc oxide (ZnO) nanowire-arrays;

the hydrophobic material includes polystyrene with toluene and deposition includes spin-coated onto the ZnO nanowire-arrays, such that toluene evaporation results in uncoated tips of the sacrificial structures; and etching includes immersion in a HCL or $CH_3COOH$ solution.

13. A method of fabricating a superhydrophobic surface, comprising:

growing a plurality of sacrificial structures, the sacrificial structures defined by zinc oxide (ZnO) nanowire-arrays;

depositing a discontinuous hydrophobic material onto the sacrificial structures; and etching the sacrificial structures to remove the grown structures while leaving the deposited material intact to result in surface features.

* * * * *